Dec. 11, 1956  L. H. MORIN  2,773,657
PLASTIC JACKETED SPOOL
Filed Feb. 28, 1951
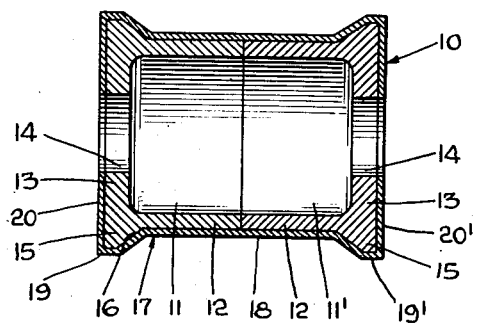
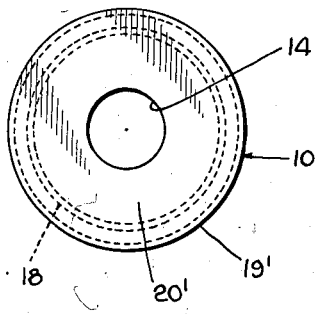
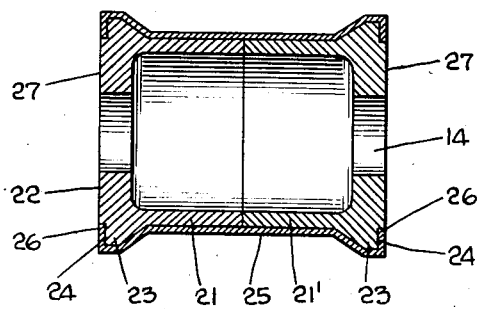
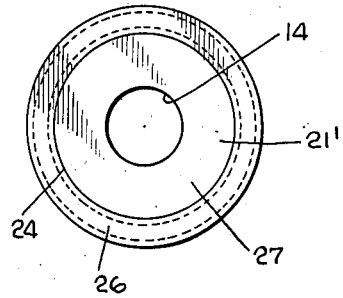
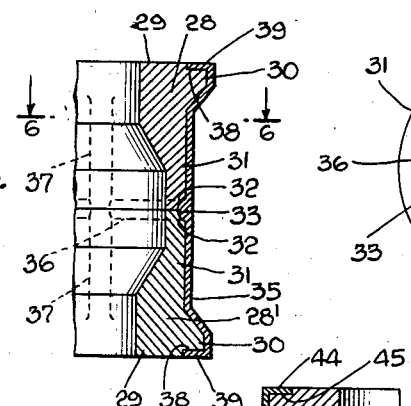
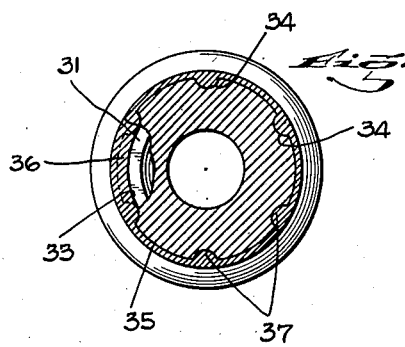
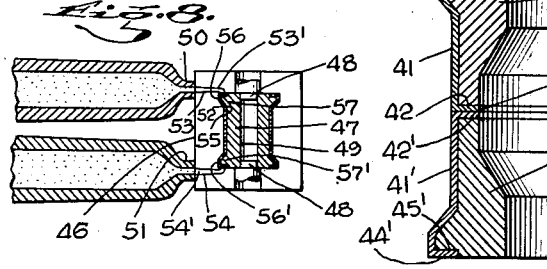
INVENTOR
LOUIS H. MORIN
BY
Howard E. Thompson
ATTORNEY

United States Patent Office 2,773,657
Patented Dec. 11, 1956

2,773,657
PLASTIC JACKETED SPOOL

Louis H. Morin, Bronx, N. Y., assignor to Coats & Clark Inc., a corporation of Delaware Application February 28, 1951, Serial No. 213,122

9 Claims. (Cl. 242—119)

This invention relates to spools used for the mounting of thread and other strands thereon. More particularly, the invention deals with devices of this kind, wherein the body portion of the spool is composed of two substantially similar end parts of wood, wood compositions or other fibrous material. Said parts are jacketed and united by a plastic portion including rim ends. Still more particularly, the invention deals with devices of the character described, wherein means is provided to reinforce and key the separate parts against relative movement.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a sectional view through one form of spool made according to my invention.

Fig. 2 is an end view of the spool shown in Fig. 1.

Fig. 3 is a view similar to Fig. 1 showing another form of spool.

Fig. 4 is an end view of the structure shown in Fig. 3.

Fig. 5 is a partial longitudinal section through another form of spool which I employ.

Fig. 6 is a section on the line 6—6 of Fig. 5 showing the complete spool, with part of the construction broken away.

Fig. 7 is a view similar to Fig. 5 showing another form of spool which I employ; and Fig. 8 is a view on a reduced scale diagrammatically indicating the method of applying plastic jackets or casings and showing a modified form of spool.

In Figs. 1 and 2 of the drawing, I have shown at 10 a spool composed of two similar spool ends 11, 11' and, as these spool ends are both of the same construction, the brief description of one will apply to the other. The body 11 has an annular wall portion 12 partially closed by an end wall 13, having an aperture 14 therein. The wall 13 has an outwardly extending annular flange 15, said flange joining the wall 12 in a bevelled wall portion 16. The two body parts 11 and 11' are joined or united together by an outer jacket 17 of plastic material, which is preferably die cast thereon. This jacket comprises a central tubular portion 18 and annular rims 19, 19' which envelope the flanges 15, the rims including facing portions 20, 20' which extend to the apertures 14. The cast jacket 17 is substantially of the same thickness throughout and, thus, may be said to completely envelope outer surfaces of the body parts 11, 11' and this jacket serves to couple said parts together in forming the resulting spool 10.

In Figs. 3 and 4 of the drawing, I have shown another construction which is much like the structures shown in Figs. 1 and 2 and differs therefrom simply in exposing part of the end walls of the spool body or body parts. For this reason, the structure shown in Figs. 3 and 4 will be briefly described as follows.

The spool comprises two similar body parts 21, 21', the end walls 22 of which, as well as the flanges 23 thereof, are grooved, as seen at 24, so that the enveloping jacket 25, similar to the jacket 17, extends only into the grooves 24, as seen at 26, thus exposing outer surfaces 27 of the bodies 21, 21' in the manner indicated.

Aside from the foregoing, the structure of Figs. 3 and 4 is the same as that shown in Figs. 1 and 2.

In Figs. 5 and 6 of the drawing, I have shown a modified form of construction, wherein two similar spool bodies 28, 28' are employed and each spool body has an end wall portion 29, flanged as seen at 30, and 31 represents the annular wall portion of the parts 28, 28'. The end of each annular wall portion 31 terminates in a curved recess 32 and these adjacent curved recesses form an annular groove 33 at abutting surfaces of the walls 31.

Circumferentially spaced on the walls 31 are longitudinally extending grooves 34, note Fig. 6, these grooves extending into the flanges 30 and also opening into the grooves 32 or, in other words, the annular groove 33. At 35 is shown the enveloping plastic jacket, substantially similar to the jacket 25, for securing the parts 28, 28' together. This jacket differs from the jacket 25, however, in that the plastic material thereof extends into the annular groove 33 to form an annular rib portion 36 at the adjacent surfaces of the walls 31, as well as longitudinal reinforcing and keying ribs 37 extending integrally from the annular rib 36 to the flange ends 30 of the spool. It will also appear that the rim portions of the plastic jacket or member 35 extend into grooves 38 in the flanges 30, as seen at 39 in Fig. 5 of the drawing.

In Fig. 7 of the drawing, I have shown another form of construction, wherein two spool bodies 40, 40' generally similar to the bodies 28, 28', are employed, with the exception that the grooves 32 and 34 are dispensed with. Here, each spool body 40, 40' is separately and individually jacketed or encased in a plastic member 41, 41' and the jacket or member 41, 41' extends onto the inner surface of each body 40, 40', as seen at 42, 42'. This provides abutting plastic surfaces which can be readily adhered together at the abutting surface 43 by any suitable adhesive. The jackets or members 41, 41' have, at their rim ends, portions 44, 44' which extend into grooves 45, 45' of the spool bodies 40, 40'.

With the structure shown in Fig. 7, instead of simultaneously uniting the two spool bodies together with a single jacket or casing, each spool body will be separately jacketed and, then, the two parts, so formed, are adhesively secured together.

In Fig. 8, I have diagrammatically illustrated the method of attaching casings, such as shown in Figs. 1 to 7, inclusive, in accordance with the teachings of a companion application, Serial Number 213,123, filed February 28, 1951, now Patent Number 2,683,572, issued July 13, 1954. In Fig. 8, 46 represents one part of a die, in the cavity of which is supported a spool body 47 on supporting pins 48 entering the bore 49 of the body 47. At 50, 51 I have shown part of two injection nozzles, through which thermoplastic material can be pressure injected into the die cavity 52 through gate passages 53, 54 in forming a continuous shell or shroud 55 upon the spool body 47, the shell or shroud including rim portions 56, 56', similar to the rims 19, 19', and formed upon end flanges 57, 57' of the body 47.

It will be understood that the method as disclosed in Fig. 8 can be utilized in forming the jackets 18, 25 as well as the jackets 35, 41. In the latter instance, a single gate passage and single injection nozzle can be used. As a matter of fact, and, as is known in the art, a single injection nozzle can be employed for said diverging gates for spreading material in a cavity instead of utilizing the two cylinders, as shown in Fig. 8.

With the method as diagrammatically seen in Fig. 8, the same steps will be followed as in the companion application hereinbefore referred to. In other words, the spool bodies 47 will be delivered from a hopper or other feed to a loading station, where the pins 48 will pick them up one at a time and deliver and support the same in the cavity 52 of the die 46, after which, the jacket or shroud is cast thereon; whereupon, the die parts are separated and the product is moved from the die by the pins 48, after which the gates 53', 54' are trimmed from the casting and the finished product delivered from a machine. The pins 48 are then returned to a delivery station to pick up the next successive spool body and the above operation is repeated. The spool body 47 of Fig. 8 differs from the other spool bodies disclosed in that it represents a one-piece spool body, rather than the separate part spool bodies shown in the other figures.

As will be appreciated, the invention provides spools that are light in weight and yet strong enough to withstand the handling to which spools are customarily subjected. In addition, the plastic covered flanges may be slitted to furnish nicks for holding the thread or strand end to prevent unravelling. Such nicks have the advantage of being non-chippable, that is, they are not subject to being broken away to render them useless for their purpose, as frequently occurs with conventional wood spools.

As stated, the body portion of the spool is preferably formed of wood or woody or fibrous material. It may be a moulded or a conventionally fabricated product. Moulded products may be formed from moulding compositions which incorporate as filler such ingredients as paper, textiles, stone or other inorganic filler, as well as woody material. Conventionally fabricated products may be made from metal, ceramic material, paper, and the like.

The spool body may comprise a single piece, or two pieces, or even three or more pieces.

Having fully described my invention, what I claim as new and desire to secure by Letters Patent is:

1. A spool of the class described, comprising a hollow body, said body, intermediate its ends, being completely enveloped by a plastic jacket, said body and jacket having interengaging means retaining the body and jacket against relative movement, said means comprising circumferentially spaced ribs on the jacket entering corresponding recesses in said body, said body being transversely divided into two halves, each half having an annular recess adjacent said division, said recesses together forming an annular groove around said body, and said jacket having an annular reinforcing rib extending into said groove.

2. A hollow, light weight thread spool comprising a body and a plastic shell around said body, said body comprising two transverse halves held together in the form of a spool by said shell, said body having flanged end portions, each said flanged end portion having a flat annular lateral surface, an annular plastic rim around each flanged end portion including said flat annular lateral surface, said plastic rim being integral with the adjacent shell and extending onto the end face of the flanged end portion, said flanged end portions having alined openings in the end faces thereof, the plastic shell and rims being die cast on said body and flanged end portions, said plastic rim being nickable to provide a thread-holding nick at a portion thereof covering said flat annular lateral surface, said nick being resistant to being broken away, and each said end face being adapted to receive and support a circular ticket label of a smaller diameter than the end face so as to expose a peripheral portion of the plastic rim.

3. A thread spool according to claim 2 in which said plastic rims cover the end faces of the spool except said openings.

4. A thread spool according to claim 2 in which each said end face has an annular groove and in which said plastic rims extend into said annular grooves.

5. A thread spool according to claim 2 in which said plastic shell is in one piece.

6. A thread spool according to claim 2 in which said body and plastic shell have interengaging means for preventing relative rotation between the body and shell.

7. A thread spool according to claim 2 in which said plastic shell is in two pieces each disposed around one of said halves.

8. A hollow, light weight thread spool for domestic use comprising two transversely divided parts, each part having a flanged end portion and a tubular portion, said flanged end portion having a flat annular lateral surface, said parts being arranged with their tubular portions adjacent each other, a plastic shell enveloping said tubular portions, an annular plastic rim around each flanged end portion including said flat annular lateral surface, said plastic rim being integral with the adjacent shell and extending onto the end face of the flanged end portion, the plastic shell on one of said parts being joined to the shell on the other part, thereby serving to hold said parts together, the plastic shell and rim having a shrink fit on each said part by virtue of having been die cast thereon, one of said plastic rims having a thread-holding nick at a portion thereof covering said flat annular lateral surface, said nick being resistant to being broken away, and each said end face being adapted to receive and support a circular ticket label of a smaller diameter than the end face so as to expose a peripheral portion of the plastic rim.

9. A hollow, light weight thread spool for domestic use comprising two transversely divided parts, each part having a flanged end portion and a tubular portion, said flanged end portion having a flat annular lateral surface, said parts being arranged with their tubular portions abutting each other, a one-piece plastic shell enveloping said tubular portions, an annular plastic rim around each flanged end portion including said flat annular lateral surface, each said plastic rim being integral with the plastic shell and extending onto the end face of the flanged end portion, said plastic shell serving to hold said parts together, the plastic shell and rims having a shrink fit on said parts by virtue of having been die cast thereon, said plastic shell having on the inner surfaces thereof a plurality of circumferentially spaced, longitudinally extending ribs and a transversely extending central rib, said longitudinal ribs engaging corresponding grooves in the outer surfaces of said abutting parts and said central rib engaging a corresponding groove which extends partly through the abutting surfaces of said parts, one of said plastic rims having a thread-holding nick at a portion thereof covering said flat annular lateral surface, said nick being resistant to being broken away, and each said end face being adapted to receive and support a circular ticket label of a smaller diameter than the end face so as to expose a peripheral portion of the plastic rim.

References Cited in the file of this patent

UNITED STATES PATENTS

| | | |
|---|---|---|
| 790,662 | Reynolds | May 23, 1905 |
| 793,680 | Reynolds | July 4, 1905 |
| 1,813,797 | Foley | July 7, 1931 |
| 1,856,415 | Halperin et al. | May 3, 1932 |
| 1,978,985 | Cobb | Oct. 30, 1934 |
| 1,981,771 | Benge | Nov. 20, 1934 |
| 2,179,879 | Dodge | Nov. 14, 1939 |
| 2,287,277 | Ryder | June 23, 1942 |
| 2,336,981 | Clickner | Dec. 14, 1943 |
| 2,344,665 | Adams | Mar. 21, 1944 |
| 2,379,990 | Rembert | July 10, 1945 |
| 2,527,520 | Bliss | Oct. 31, 1950 |
| 2,589,640 | Stahl | Mar. 18, 1952 |

FOREIGN PATENTS

| | | |
|---|---|---|
| 598 | Great Britain | of 1859 |
| 633,182 | Great Britain | Dec. 12, 1949 |